United States Patent
Soga et al.

(10) Patent No.: US 8,213,128 B2
(45) Date of Patent: Jul. 3, 2012

(54) HEAD-GIMBAL ASSEMBLY INCLUDING PIEZOELECTRIC ELEMENTS AFFIXED TO A DEFORMABLE PLATE HAVING A HOLE THEREIN AND AFFIXED TO A BASE PLATE WHEREIN THE BASE PLATE HAS PROJECTION MEMBERS ON FRONT EDGES THEREOF

(75) Inventors: Eiji Soga, Kanagawa (JP); Hiroyasu Tsuchida, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 126 days.

(21) Appl. No.: 12/870,626

(22) Filed: Aug. 27, 2010

(65) Prior Publication Data
US 2011/0051289 A1   Mar. 3, 2011

(30) Foreign Application Priority Data
Aug. 28, 2009   (JP) ................................ 2009-198971

(51) Int. Cl.
*G11B 5/56* (2006.01)
(52) U.S. Cl. .................................................. 360/294.4
(58) Field of Classification Search ..... 360/294.3–294.4
See application file for complete search history.

(56) References Cited

U.S. PATENT DOCUMENTS

| | | | |
|---|---|---|---|
| 6,239,953 B1 * | 5/2001 | Mei | 360/294.6 |
| 6,661,619 B2 | 12/2003 | Nishida et al. | |
| 7,130,159 B2 | 10/2006 | Shimizu et al. | |

FOREIGN PATENT DOCUMENTS

| | | |
|---|---|---|
| JP | 2000163892 | 6/2000 |
| JP | 2000357377 | 12/2000 |
| JP | 2001229633 | 8/2001 |
| JP | 2001307443 | 11/2001 |
| JP | 2002184139 | 6/2002 |
| JP | 2002184142 | 6/2002 |

* cited by examiner

*Primary Examiner* — Allen Heinz (57) ABSTRACT

A head-gimbal assembly (HGA). The HGA includes a deformable plate affixed to a load beam, a piezoelectric element affixed to the deformable plate, and a base plate affixed to the deformable plate. The deformable plate includes: a hole; a first section in front of the hole and affixed to the load beam; a second section behind the hole and affixed to the base plate; and, first and second spring members that join the first section and the second section, can deform in a front-back direction, and are positioned to sandwich the hole in a left-right direction. The piezoelectric element is affixed between the first section and the second section. The base plate includes projection members on a front edge of the plate and projecting out toward the first section. The front edges of the projection member are positioned further to a front edge than a back edge of the hole.

20 Claims, 6 Drawing Sheets

HEAD-GIMBAL ASSEMBLY INCLUDING PIEZOELECTRIC ELEMENTS AFFIXED TO A DEFORMABLE PLATE HAVING A HOLE THEREIN AND AFFIXED TO A BASE PLATE WHEREIN THE BASE PLATE HAS PROJECTION MEMBERS ON FRONT EDGES THEREOF

CROSS-REFERENCE TO RELATED APPLICATION

This application claims priority from the Japanese Patent Application No. 2009-198971, filed Aug. 28, 2009, the disclosure of which is incorporated herein in its entirety by reference.

TECHNICAL FIELD

Embodiments of the present invention relate to head-gimbal assembly including piezoelectric elements.

BACKGROUND

Devices which use various types of recording disks, such as optical disks, magneto-optical disks, or flexible magnetic-recording disks, are known as disk drive devices. Of these, the hard-disk drive (HDD) has spread widely as a storage device for computers and is becoming an indispensable information-storage device in current computer systems. In addition, HDD applications, such as video recording and playback devices, car navigation systems, or portable telephones, are increasing because of the superior characteristics of HDDs.

A magnetic-recording disk used in an HDD has a plurality of data tracks and a plurality of servo tracks formed in concentric circles on the magnetic-recording disk. A plurality of data sectors containing user data is recorded in each data track. Each servo track contains address information. The servo tracks are constructed from a plurality of servo data regions separated in the circumferential direction; and, one or a plurality of data sectors is recorded between the servo data regions. By accessing the desired data sector in accordance with the address information of the servo data, a magnetic-recording head can write data to a data sector and read data from a data sector.

The magnetic-recording head is formed on a slider; and, the slider is affixed on the suspension of an actuator. The assembly of the actuator and the head-slider is referred to as a head-stack assembly (HSA). In addition, the assembly of the suspension and the head-slider is referred to as a head-gimbal assembly (HGA). By balancing the pressure due to the viscosity of the air between the air bearing surface of the slider disposed in proximity to the recording surface of the a rotating magnetic-recording disk with a load applied in the direction of the magnetic-recording disk by the suspension, the head-slider can fly above the magnetic-recording disk. By swinging the actuator about the pivot shaft, the head-slider moves to the target track and is positioned above that track.

With the advance of HDD technology, accompanying an increase in the tracks per inch (TPI) of the magnetic-recording disk, the positioning precision of the head-slider is also increased. However, the actuator driven by a voice coil motor (VCM) has limited positioning precision. Therefore, technology for a dual-stage actuator that is equipped with a compact actuator, known by the term of art "microdrive actuator," has been incorporated in the rotary actuator and provides for finer positioning of the magnetic-recording head. Therefore, engineers and scientists engaged in HDD manufacturing and development are interested in finding ways to more accurately control the positioning of the dual-stage actuator.

SUMMARY

Embodiments of the present invention include a head-gimbal assembly (HGA). The HGA includes a slider, a gimbal including a first surface that is affixed to the slider, a load beam affixed to a surface opposite the first surface of the gimbal, a deformable plate affixed to a back side of the load beam, a piezoelectric element affixed to the deformable plate, and a base plate that is affixed to the deformable plate behind the piezoelectric element and is separated from the piezoelectric element. The deformable plate includes: a hole where at least a portion pierces through; a first section that is in front of the hole and is affixed to the load beam; a second section that is behind the hole and is affixed to the base plate; and, first and second spring members that join the first section and the second section, can deform in a front-back direction in response to a motion of the piezoelectric element, and are positioned to sandwich the hole in a left-right direction. The piezoelectric element is affixed between the first section and the second section. The base plate includes projection members that are on a front edge of the plate and project out toward the first section while avoiding the piezoelectric element. The front edges of the projection member are positioned further to a front edge than a back edge of the hole. Embodiments of the present invention also include a disk drive including the HGA.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Head Gimbal Assembly Including Piezoelectric Elements With relevance to embodiments of the present invention, one microdrive actuator, known in the art, includes a structure providing fine motion to the head-slider by affixing piezoelectric elements on the suspension. This kind of microdrive actuator includes one, or a plurality of, piezoelectric elements affixed on a gimbal tongue, a load beam, or a base plate. The microdrive actuator directly moves the head-slider, or a part of, the suspension by the expansion and contraction of the piezoelectric elements, and provides for high-precision positioning in the radial direction of the head-slider.

In the design of the suspension, an increase in the rigidity and a higher resonant frequency are provided. This is the same even for a suspension with mounted piezoelectric elements. On the other hand, for a suspension with mounted piezoelectric elements, the motions of the piezoelectric elements and the accompanying motion (deformation) of the suspension are not impeded. Consequently, in a head-gimbal assembly (HGA) with mounted piezoelectric elements used in positioning the head-slider, a HGA structure provides rigidity of the suspension without impeding the positioning of the head-slider by the expansion and contraction motions of the piezoelectric elements.

In accordance with embodiments of the present invention, the HGA includes a slider, a gimbal including a first surface that is affixed to the slider, a load beam affixed to a surface opposite the first surface of the gimbal, a deformable plate affixed to a back side of the load beam, a piezoelectric element affixed to the deformable plate, and a base plate that is affixed to the deformable plate behind the piezoelectric element and is separated from the piezoelectric element. The deformable plate includes: a hole where at least a portion pierces through; a first section that is in front of the hole and is affixed to the load beam; a second section that is behind the hole and is affixed to the base plate; and, first and second spring members that join the first section and the second section, can deform in a front-back direction in response to a motion of the piezoelectric element, and are positioned to sandwich the hole in a left-right direction. The piezoelectric element is affixed between the first section and the second section. The base plate includes projection members that are on a front edge of the plate and project out toward the first section while avoiding the piezoelectric element. The front edges of the projection member are positioned further to a front edge than a back edge of the hole. Thus, in accordance with embodiments of the present invention, the rigidity of the suspension can be increased without impeding the motion of the suspension responding to the expansion and contraction of the piezoelectric element.

In accordance with an embodiment of the present invention, the base plate includes a projection member on the left and on the right of the front edge. Thus, in accordance with an embodiment of the present invention, the rigidity of the suspension can be improved while the suspension balance is maintained.

In accordance with an embodiment of the present invention, the piezoelectric element is affixed in the hole. Thus, in accordance with an embodiment of the present invention, the piezoelectric element can be affixed at a specified position; and, the affixing regions of the adhesive agent can be limited.

In accordance with an embodiment of the present invention, the spring members and the base plate do not overlap when viewed in the direction of the stacked layers of the load beam and the gimbal. Thus, in accordance with an embodiment of the present invention, the possibility of damaging the spring members by contact of the spring members with the base plate can be greatly reduced.

In accordance with an embodiment of the present invention, the front edges of the projection members are positioned further to the back than the spring members. Thus, in accordance with an embodiment of the present invention, the possibility of damage to the spring members by contact between the spring members and the base plate is greatly reduced; and, excessive much weight on the suspension can be avoided.

In accordance with an embodiment of the present invention, the outer edges in the left-to-right direction of the projection members are positioned further to the outside than the outer sides of the spring members in the left-to-right direction. Thus, in accordance with an embodiment of the present invention, the function of protecting the spring members by the projection members is provided.

In accordance with an embodiment of the present invention, the front edges of the projection members are positioned in front of the back edge of the piezoelectric element. Thus, in accordance with an embodiment of the present invention, the rigidity of the suspension is increased.

In accordance with an embodiment of the present invention, the base plate has a shape with left-right symmetry. Thus, in accordance with an embodiment of the present invention, the rigidity of the suspension can be increased while the balance of the suspension is maintained.

In accordance with an embodiment of the present invention, at least a portion of the outer edges in the left-right direction of the projection members projects further to the outside than the overlapping portion of the deformable plate. Thus, in accordance with an embodiment of the present invention, positioning and holding the suspension can be provided in the HGA.

In accordance with an embodiment of the present invention, the fixing points between the base plate and the deformable plate are in front of the center between the back edge of the hole and the front edge of the swage hole. Thus, in accordance with an embodiment of the present invention, the rigidity of the suspension can be increased.

Embodiments of the present invention provide for rigidity of the suspension without impeding the motion of the suspension responding to the expansion and contraction of the piezoelectric element. In accordance with embodiments of the present invention, an example of a disk drive is subsequently described as a HDD, without limitation thereto. In accordance with embodiments of the present invention, the HDD includes a dual-stage actuator that includes a positioning mechanism based on a voice coil motor (VCM) and a positioning mechanism, which is a microdrive actuator, based on one, or a plurality of, piezoelectric elements on a suspension. The piezoelectric element is fixed on top of the suspension. As the piezoelectric element expands and contracts, the suspension deforms, and the head-slider is finely driven in the radial direction of the disk.

In accordance with embodiments of the present invention, the suspension includes a deformable plate fixed to a load beam and a base plate fixed to the deformable plate. The piezoelectric element is fixed on top of the deformable plate. The deformable plate deforms together with the expansion and contraction motions of the piezoelectric element; and thus, the load beam moves in the radial direction of the disk. The load beam and the gimbal fixed to the load beam, and the head-slider on the gimbal move finely in the radial direction of the disk.

In accordance with embodiments of the present invention, the suspension includes the deformable plate and base plate structures. The shape of the base plate is appropriately designed to match the shape of the deformable plate. The rigidity of the suspension can be increased without impeding the deformation of the deformable plate as the piezoelectric element expands and contracts. Thus, in accordance with embodiments of the present invention, the resonant frequency of the suspension can be raised; the positioning precision of the head-slider can be increased; and, the head-slider on the gimbal can be moved finely in the radial direction of the disk.

Figure 1:
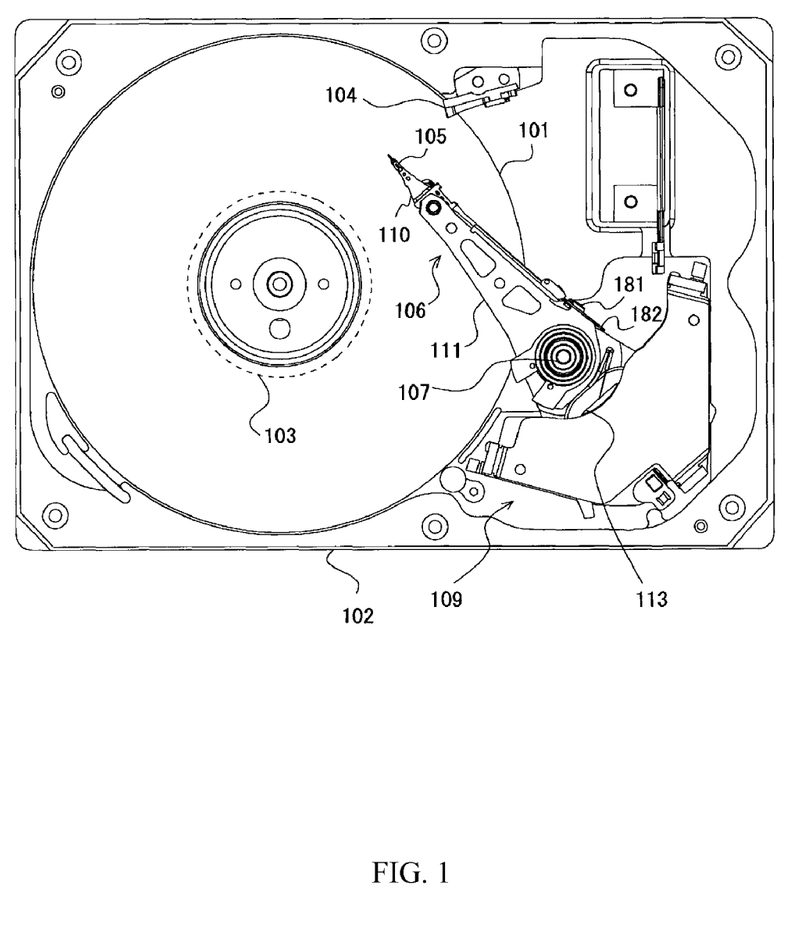
FIG. 1 is a top view showing the interior of a HDD with the disk-enclosure (DE) cover removed, in accordance with one or more embodiments of the present invention.

With reference now to FIG. 1, in accordance with one or more embodiments of the present invention, a top view is shown of the interior of a HDD with the disk-enclosure (DE) cover removed. The mechanical structural elements of an HDD 1 are accommodated in a disk-enclosure (DE) base 102. The structural elements in the DE base 102 are controlled by a control circuit on a printed circuit board (PCB) fixed outside of the DE base 102. The HDD 1 includes a magnetic-recording disk 101, which is the disk for storing data, and a head-slider 105 for accessing the magnetic-recording disk 101. As used herein, "access" is a term of art that refers to operations in seeking a data track of a magnetic-recording disk and positioning a magnetic-recording head on the data track for both reading data from, and writing data to, a magnetic-recording disk. The head-slider 105 includes a magnetic-recording head for writing the user data to, and/or reading the user data from, the magnetic-recording disk 101, and a slider, which includes the magnetic-recording head formed on the surface.

A rotary actuator 106 supports the head-slider 105 and moves the head-slider 105 above the rotating magnetic-recording disk 101 by a swinging motion having a center of rotation at a pivot shaft 107. A voice-coil motor (VCM) 109, as the drive mechanism, drives the rotary actuator 106.

The rotary actuator 106 is disposed with each structural member joining a suspension 110, an arm 111, and a voice coil 113 from the front edge in the lengthwise direction where the head-slider 105 is positioned. The assembly of the suspension 110 and the head-slider 105 is referred to as the HGA. In addition, the assembly of the rotary actuator 106 and the head-slider 105 is referred to as the head-stack assembly (HSA).

A spindle motor (SPM) 103 fixed to the DE base 102 rotates the magnetic-recording disk 101 at the specified angular speed. By balancing the pressure caused by the viscosity of the air between the air bearing surface of the slider in proximity to the recording surface of the rotating magnetic-recording disk 101 and the load applied in the direction of the magnetic-recording disk 101 by the suspension 110, the head-slider 105 flies above the magnetic-recording disk 101. The signal of the head-slider 105 is amplified by an arm electronics (AE) module 181, which are close to the pivot shaft 107. The AE module 181 is mounted on a PCB 182.

When the head-slider 105 is not accessing, the rotary actuator 106 stops on a load/unload ramp 104 disposed at the outside of the magnetic-recording disk 101. However, embodiments of the present invention may, or may not, include a load/unload ramp 104 and can also be applied to both a HDD where the rotary actuator 106 and the HGA, when not accessing, move to an inner peripheral region of a magnetic-recording disk, or alternatively, to an outer peripheral region of a magnetic-recording disk.

In the descriptions of the HSA and the HGA, described herein, the direction which is perpendicular to the pivot shaft 107 and connects the respective centers of the pivot shaft 107 and the head-slider 105 is referred to as the front-back direction. This direction is the direction parallel to the recording surface of the magnetic-recording disk 101. Furthermore, the position where the head-slider 105 is affixed is in front of the position of the pivot shaft 107. In the rotary actuator 106, the suspension 110 is affixed in front of the arm 111; and, the voice coil 113 is positioned behind the arm 111.

As used herein, the direction parallel to the pivot shaft 107 is referred to as the up-down direction. The up-down direction is the direction of the normal to the recording surface of the magnetic-recording disk 101. In a structure where the rotary actuator 106 includes a plurality of HGAs, the plurality of HGAs is arranged in the up-down direction. The head-slider 105 is positioned between the suspension 110 and the magnetic-recording disk 101. Looking at the HGA, this position is defined as a higher position for the suspension 110 than the head-slider 105. In addition, the perpendicular direction to the pivot shaft 107 and to the front-back direction is referred to as the left-right direction. The oscillation direction of the rotary actuator 106 on the pivot shaft 107 is the left-right direction.

Figure 2:
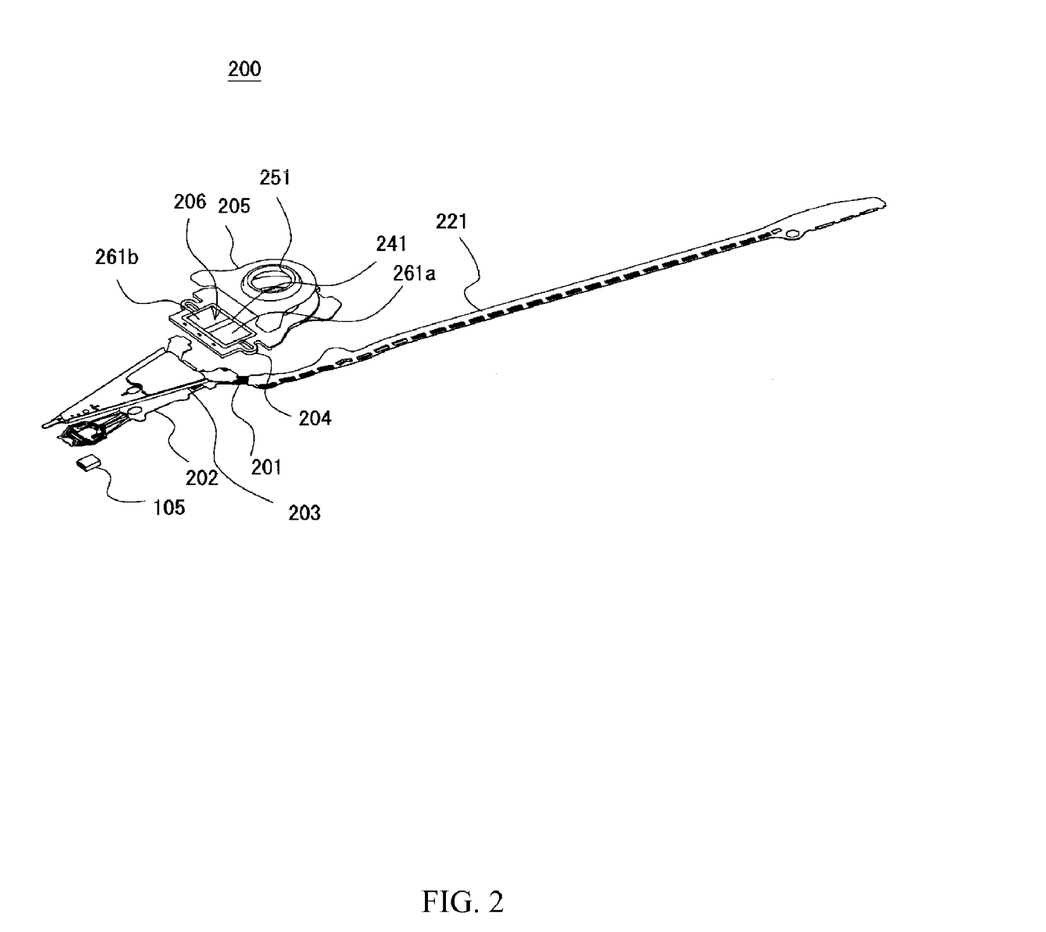
FIG. 2 is an exploded perspective view schematically showing the structure of a head-gimbal assembly (HGA), in accordance with one or more embodiments of the present invention.

With reference now to FIG. 2, in accordance with one or more embodiments of the present invention, an exploded perspective view is shown of the structure of HGA 200. HGA 200 includes a suspension 110 and a head-slider 105. The suspension 110 includes a gimbal 202, a load beam 203, a deformable plate 204, and a base plate 205. A piezoelectric element 206 is affixed in the hole 241 formed in the deformable plate 204.

The head-slider 105 is affixed to the surface of the gimbal 202 opposite the magnetic-recording disk 101. Typically, the head-slider 105 is affixed to the gimbal 202 by an adhesive agent. The gimbal 202 is affixed to the surface of the load beam 203 opposite the magnetic-recording disk 101. Typically, the gimbal 202 is affixed by laser spot welding to the load beam 203. In the gimbal 202, the load beam 203 is affixed to the surface opposite the surface affixing the head-slider 105.

Following the above definitions of the directions, the load beam 203 is affixed to the upper surface of the gimbal 202, and the head-slider 105 is affixed to the lower surface. A transmission line 201 is formed on the gimbal 202, which includes the tail member 221 extending to the back. The transmission line 201 includes a flexible-printed-circuit (FPC) structure. The transmission line 201 is affixed to the same surface as the head-slider 105 on the gimbal 202. The transmission line 201 transmits the signals for driving and controlling the piezoelectric element 206, in addition to, the read and write signals.

A deformable plate 204 is affixed behind the load beam 203. In the structural example shown in FIG. 2, the back edge of the load beam 203 is affixed to the deformable plate 204. In this structural example, the deformable plate 204 is affixed to the top surface of the load beam 203. The deformable plate 204 may be affixed to any surface of the load beam 203. Typically, the deformable plate 204 is affixed by laser spot welding to the load beam 203.

The base plate 205 is affixed to the deformable plate 204. In this structural example, the base plate 205 is affixed to the top surface of the deformable plate 204. The base plate 205 may be affixed to the lower surface of the deformable plate 204. The base plate 205 includes a swage hole 251. Usually, the base plate 205 is affixed by laser spot welding to the deformable plate 204.

The base plate 205 includes a swage hole 251. The swage hole 251 is the hole for affixing HGA 200 to the arm 111. By crimping, a portion of the periphery of the swage hole 251 is deformed by passing a bulb through the swage hole 251 to affix the base plate 205, namely, HGA 200, to the arm 111. The deformable plate 204 also includes a hole 250 overlapping the swage hole 251. The hole 250 is larger than the swage hole 251 and is the hole for passing the bulb through in the crimping process. The deformable plate 204 does not substantially deform during the crimping operation and does not essentially contribute to affixing these components.

In accordance with an embodiment of the present invention, the load beam 203 functions as a precision thin-plate spring and is formed from stainless steel (SUS). The load beam 203 generates a load on the head-slider 105 through elasticity. In accordance with an embodiment of the present invention, the gimbal 202 is formed from stainless steel (SUS). The rigidity of the gimbal 202 is lower than that of the load beam 203. The gimbal 202 supports the head-slider 105 and contributes to the attitude control of the head-slider 105 by freely tilting.

Similarly, in accordance with another embodiment of the present invention, both the deformable plate 204 and the base plate 205 are formed from stainless steel (SUS). In accordance with embodiments of the present invention, Stainless steel is the specified material for the suspension material because the Young's modulus is higher compared to that of other materials, and rust is not produced because a non-friable, adherent film is formed on the surface.

The deformable plate 204 is affixed to the back edge of the load beam 203. The deformable plate 204 is deformed with the motion of the piezoelectric element 206, and the load beam 203 vibrates in the left-right direction, which is the radial direction of the magnetic-recording disk 101. Together with the motion of the load beam 203, the head-slider 105 affixed via the gimbal 202 to the load beam is finely driven in the radial direction of the magnetic-recording disk 101. The piezoelectric element 206 and the portion of the head-slider 105, which is moved by the deformation accompanying the motion of the piezoelectric element 206 in the suspension 110, form the microdrive actuator.

In this structure, the piezoelectric element 206 includes two sections 261a and 261b. The sections 261a and 261b expand and contract in the front-back direction. The sections 261a and 261b have opposite polarizations. That is, the respective axes of polarization are parallel, and the directions of polarization are reversed. The same drive voltage is applied to the sections 261a and 261b which expand and contract in opposite directions. The deformable plate 204 is deformed by the motion of the piezoelectric element 206, and the front edge of the plate moves in the left-right direction.

One drive signal wire in the transmission line 201 is connected to the piezoelectric element 206. The same drive signal is applied to the sections 261a and 261b; and; the sections 261a and 261b simultaneously exhibit mutually opposite expansion and contraction motions by following the single drive signal. One piezoelectric element 206 includes two sections 261a and 261b; but, the two sections may be formed from different piezoelectric elements. The number of piezoelectric elements mounted on the HGA may be greater than described above, being within the spirit and scope of embodiments of the present invention.

Figure 3:
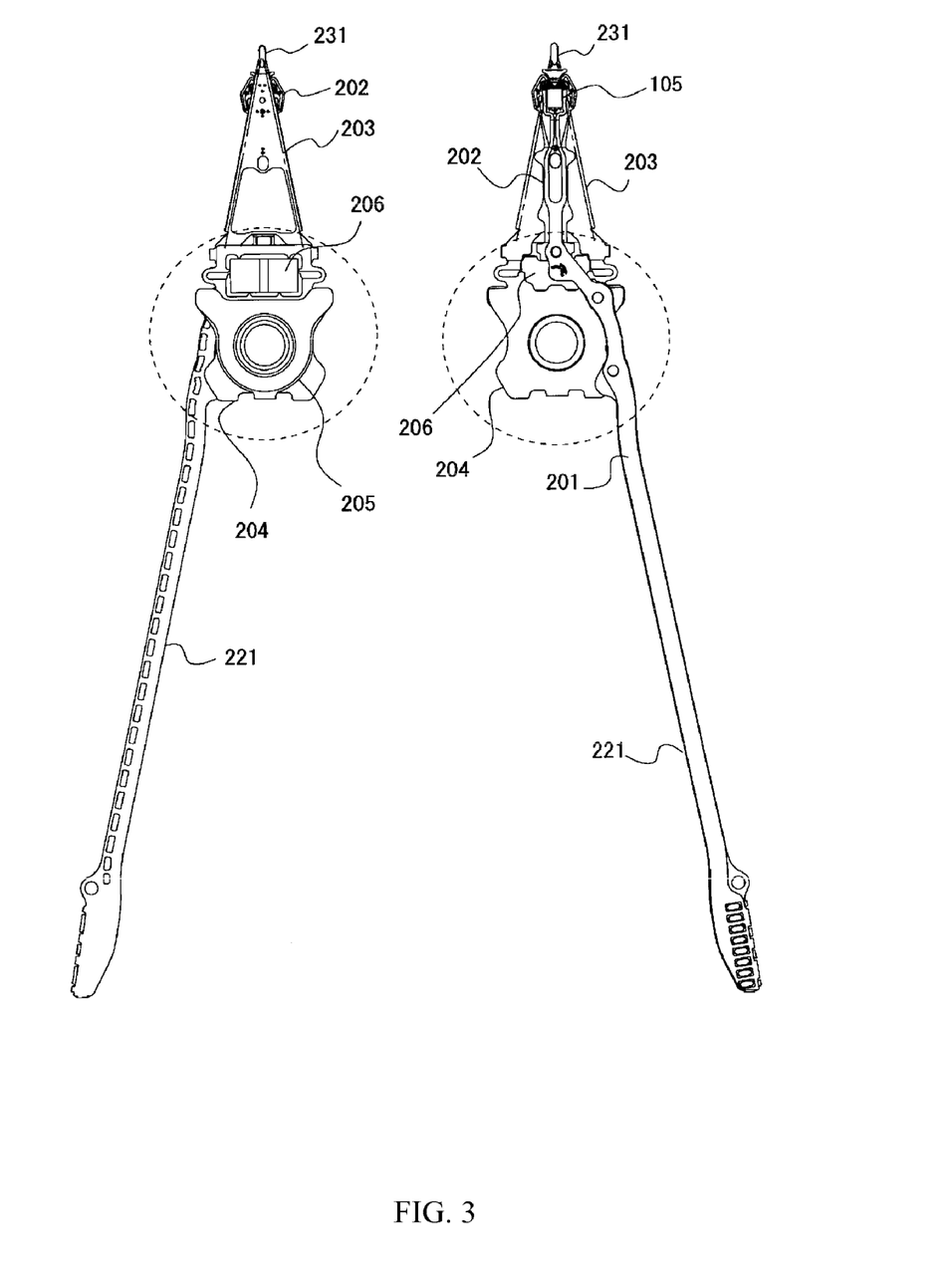
FIG. 3 is a top view schematically showing the HGA structure, in accordance with one or more embodiments of the present invention.

With reference now to FIG. 3, in accordance with one or more embodiments of the present invention, a top view schematically shows the structure of HGA 200. In FIG. 3, the drawing on the left side is the view of HGA 200 seen from the top side, which is the load beam side; and, the drawing on the right side is the view of HGA 200 seen from the lower side, which is the head-slider side. The HGA including this structure is a ramp load/unload HGA. The load beam 203 includes a merge lip 231 at the front edge for sliding on the load/unload ramp 104. In a HDD that has a standby position for the rotary actuator 106 in the inner peripheral region or the outer peripheral region of the magnetic-recording disk 101, the load beam does not have a merge lip. In this structure, HGA 200 has a shape with left-right symmetry except for the tail member 221 of the gimbal 202 extending to the back and the transmission line 201 on top. Embodiments of the present invention can be applied to an HGA having a shape which does not have left-right symmetry.

Figure 4:
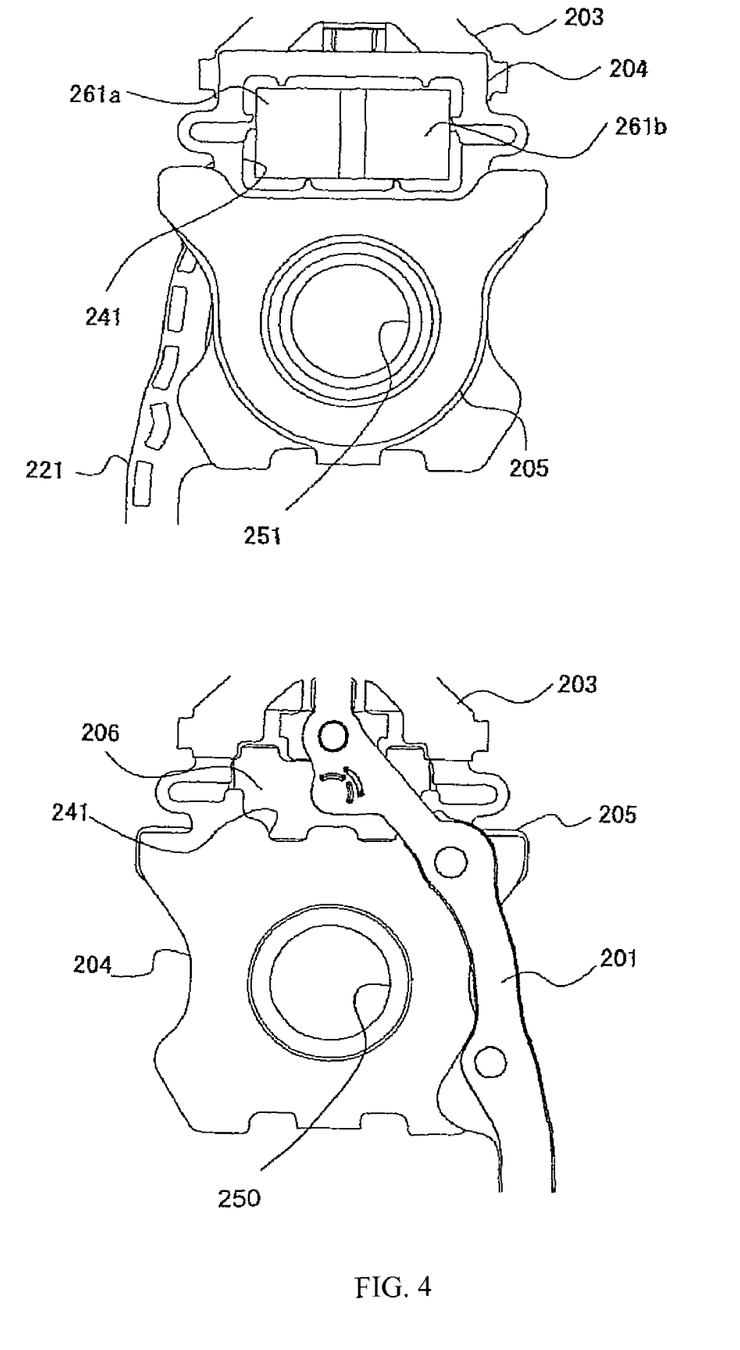
FIG. 4 is a top view schematically showing the structures of the piezoelectric element, the deformable plate, and the base plate in the HGA, in accordance with one or more embodiments of the present invention.

With reference now to FIG. 4, in accordance with one or more embodiments of the present invention, an expanded view is shown of the portion including the deformable plate 204 and the base plate 205; and, an expanded view is shown of the portion in the circle indicated by the dashed line in HGA 200 shown in FIG. 3. In one embodiment of the present invention, the HGA 200 includes the deformable plate 204 and the base plate 205. The top drawing is a partial expanded view of HGA 200 seen from above and an expanded view of the portion in the region outlined by the dashed line in the drawing on the left side of FIG. 3. The lower drawing is a partial expanded view in the surface opposite the magnetic-recording disk 101 of HGA 200 and is an expanded view of the portion in the region outlined by the dashed line in the drawing on the right side of FIG. 3. The piezoelectric element sections 261a and 261b are arranged in one row in the left-right direction in the hole 241 formed in the deformable plate 204. Typically, the piezoelectric element 206 is affixed by an adhesive agent to the deformable plate 204 in the hole 241.

Figure 5:
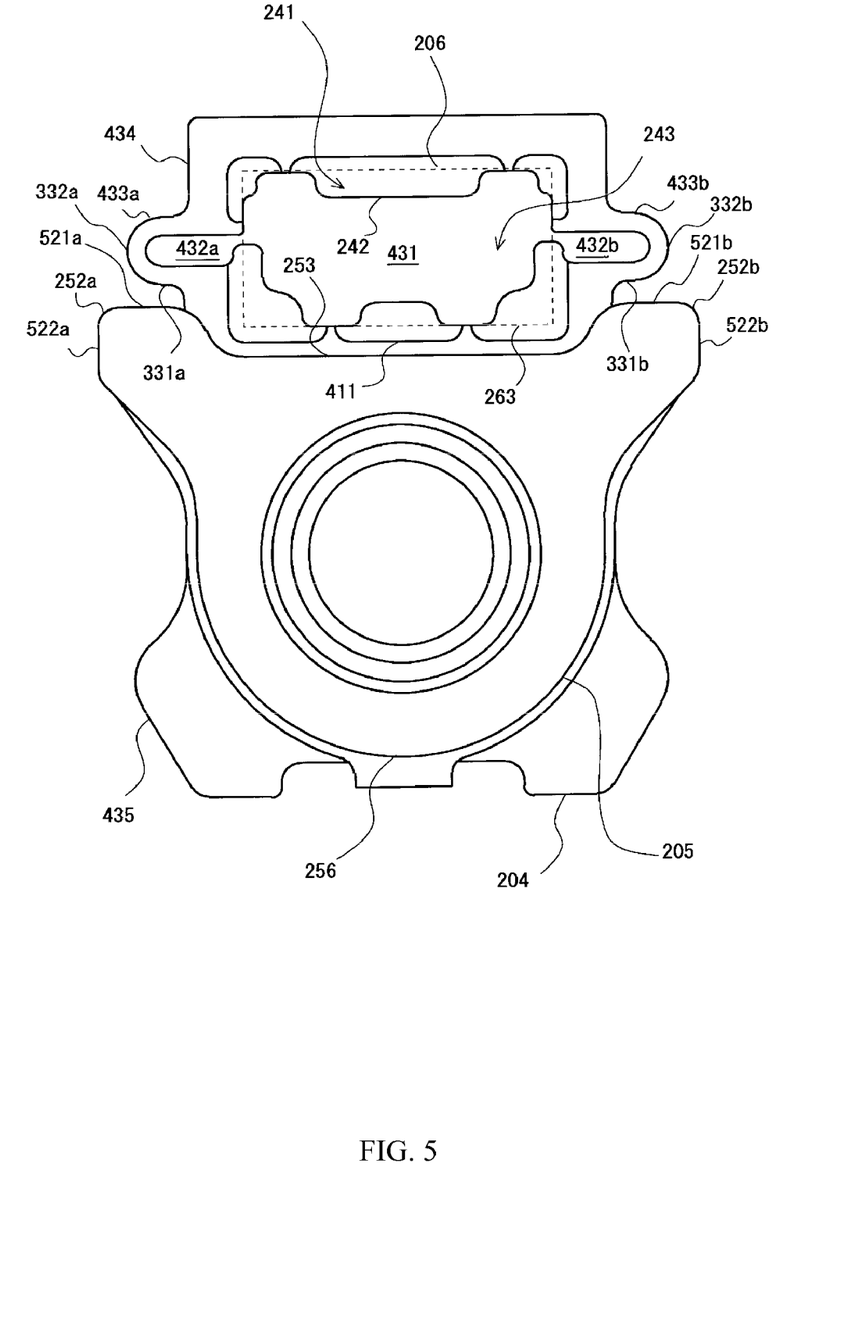
FIG. 5 is a top view schematically showing the structures of the deformable plate and the base plate in the HGA, in accordance with one or more embodiments of the present invention.

With reference now to FIG. 5, in accordance with one or more embodiments of the present invention, a top view is shown of the deformable plate 204 and the base plate 205 affixed on top and is the view seen from the base plate 205 side. In FIG. 5, the dashed line rectangle indicates the piezoelectric element 206 affixed in the hole 241.

A stage 242 is formed in the hole 241. The height of the surface, which is the top surface, of the stage 242 in the hole 241 is positioned between the topmost surface and the bottommost surface of the deformable plate 204. In this structural example, the stage 242 is divided into six sections. The stage 242 includes the base plate 205 affixed to the topmost surface and the load beam 203 affixed to the bottommost surface. The hole 241 and the stage 242 can be formed by etching, and the stage projects out from a portion of the inner sidewall of the hole 241. Parts of the hole 241 are pierced through, and a through-hole 243 is formed in the hole 241.

The piezoelectric element 206 is mounted on the stage 242 in the hole 241 and affixed in the hole 241 by an adhesive agent. The adhesive agent affixes the piezoelectric element 206 to the stage 242 and, usually, also affixes the element to the inner sidewall of the hole 241. If the piezoelectric element 206 can be affixed in the hole 241, the shape of the stage 242 is not particularly limited, and the stage 242 does not have to be formed. Alternately, the piezoelectric element 206 may be affixed to the top surface, or the lower surface, of the deformable plate 204 outside of the hole 241. However, in accordance with an embodiment of the present invention, to prevent the flow of the adhesive agent and to harden the adhesive agent at the desired positions, the piezoelectric element 206 is affixed on top of the stage 242 in the hole 241.

In this structural example, when viewed in the up-down direction, namely, the direction of the layers of the deformable plate 204 and the base plate 205, the piezoelectric element 206 closes up a portion 431 of the through-hole 243; and, portions 432a and 432b of the through-hole 243 are cut out. On both the left and right sides of the piezoelectric element 206, the slit-shaped portions 432a and 432b of the through-hole 243 are cut out. In this example, the length in the front-back direction of the portion 431 of the through-hole is larger than that of the portions 432a and 432b of the through-hole. The left side of the hole 432a and the right side of the hole 432b are blocked by the spring members 433a and 433b, respectively. If the deformable plate 204 can deform as desired by the expansion and contraction motions of the piezoelectric element 206, the positional relationship of the piezoelectric element 206 and the through-hole 243 is not particularly limited. In addition, the portions 431, 432a and 432b of the through-hole may have other shapes.

The deformable plate 204 includes a first section 434 on the front side and a second section 435 on the back side sandwiching the hole 241. Furthermore, the spring members 433a and 433b join the first section 434 and the second section 435, respectively. The spring members 433a and 433b deform in response to the expansion and contraction of the piezoelectric element 206 and produce an incline in the left-right direction of the front edge of the deformable plate 204 and the load beam 203.

A portion of the stage 242 is formed at the back edge of the first section 434 in the hole 241. The other portion of the stage 242 is formed at the front edge of the second section 435. The first section 434 and the second section 435 are separated in the front-back direction by the through-hole 243. From the expansion and contraction of the piezoelectric element 206, the first section 434 inclines to the right, or left, with respect to the second section 435 affixed to the arm 111, and moves the load beam 203 and the head-slider 105 in the radial direction of the magnetic-recording disk 101.

The spring members 433a and 433b are positioned to sandwich the hole 241 in the left-right direction. The spring members 433a and 433b are members which have spring characteristics, and have the minimum rigidity with respect to the expansion and contraction motions of the piezoelectric element 206. In one structural example, in accordance with an embodiment of the present invention, the spring members 433a and 433b are curved U-shaped members and project out toward the outside of the deformable plate 204. Specifically, spring member 433a projects out to the left side, and spring member 433b projects out to the right side. In accordance with an embodiment of the present invention, this shape, which is easy to form and exhibits the specified spring characteristics, is one shape of the spring members. In addition to this shape, the spring members can have another shape, which exhibits elasticity such as: a V shape, a W shape, an S shape, or a shape that connects these shapes in the front-back direction.

The base plate 205 is affixed to the top of the second section 435 of the deformable plate 204 behind the piezoelectric element 206 and the hole 241. The base plate 205 is not in contact with the piezoelectric element 206, does not overlap the hole 241, and is separated from both. The base plate 205 may overlap a portion of the hole 241 if the motion of the piezoelectric element 206 and the deformation of the deformable plate 204 are not impeded. However, in accordance with an embodiment of the present invention, if the affixing of the piezoelectric element 206 in the hole 241 with an adhesive agent and manufacturing differences are considered, the base plate 205 may be outside and not overlap the hole 241.

The base plate 205 includes left and right projection members 252a and 252b on the front edge. In accordance with an embodiment of the present invention, the projection members 252a and 252b have linearly symmetric shapes in the left-right direction. The members may also have asymmetric shapes. The projection members 252a and 252b project toward the first section 434, which is forward, while avoiding the piezoelectric element 206. The front edges 521a and 521b of the projection members 252a and 252b are positioned further forward than the position of the back edge 411 of the hole 241. The rigidity of the suspension 110 can be increased and the resonant frequency can be raised by the projection members 252a and 252b having this kind of shape.

As illustrated in FIG. 5, in the one structure in accordance with an embodiment of the present invention, the front edges 521a and 521b of the projection members 252a and 252b are positioned further in front than the back edge 263 of the piezoelectric element 206. Thus, the rigidity of the suspension 110 can be further increased. In accordance with an embodiment of the present invention, the projection members 252a and 252b, which project to the front, do not impede the movements of the spring members 433a and 433b. In addition, external shocks may vibrate the load beam 203 in the up-down direction and deform the spring members 433a and 433b in the up-down direction. Under these circumstances, when the projection members 252a and 252b come into contact with the spring members 433a and 433b, the spring members 433a and 433b may be damaged.

Therefore, when the projection members 252a and 252b of the base plate 205 are viewed in the layering direction, which is the up-down direction, of the load beam 203 and the gimbal 202, in accordance with an embodiment of the present invention, there is no overlapping with the spring members 433a and 433b. In addition, because projections, which are too long, add weight to the suspension, the front edges 521a and 521b of the projection members 252a and 252b may be positioned further back than the back edges 331a and 331b of the spring members 433a and 433b.

In this structural example, the front edges 521a and 521b of the projection members 252a and 252b are flat surfaces extending in the left-right direction. However, the front edges 521a and 521b may have other shapes. For example, the front edges may have curved shapes when viewed from above. In accordance with embodiments of the present invention, no matter what the shapes of the projection members are the positions of the front edges, which are at the most forward positions, satisfy the above conditions.

The front edge 253 of the base plate 205 between the projection members 252a and 252b is behind the back edge 411 of the hole 241 in the deformable plate 204. The front edge 253 is opposite the back edge 411 in the front-back direction. As described above, in accordance with an embodiment of the present invention, the base plate 205 is on the outside of the hole 241; and, the front edge 253 is at the position of this condition.

When viewed in the left-right direction, the projection members 252a and 252b overlap a portion of the hole 241 and a portion of the piezoelectric element 206. In accordance with an embodiment of the present invention, the outer edges 522a and 522b of the projection members 252a and 252b are positioned further outside than the outer edges 332a and 332b of the spring members 433a and 433b. Namely, in FIG. 6, the left edge 522a of the projection member 252a projects further outside than the left edge 332a of spring member 433a and is positioned on the left. In addition, the right edge 522b of the projection member 252b projects further outside than the right edge 332b of spring member 433b and is positioned on the right. Thus, In accordance with embodiments of the present invention, the projection members 252a and 252b are able to more effectively perform the function of protecting the spring members 433a and 433b from shocks with other objects.

Figure 6:
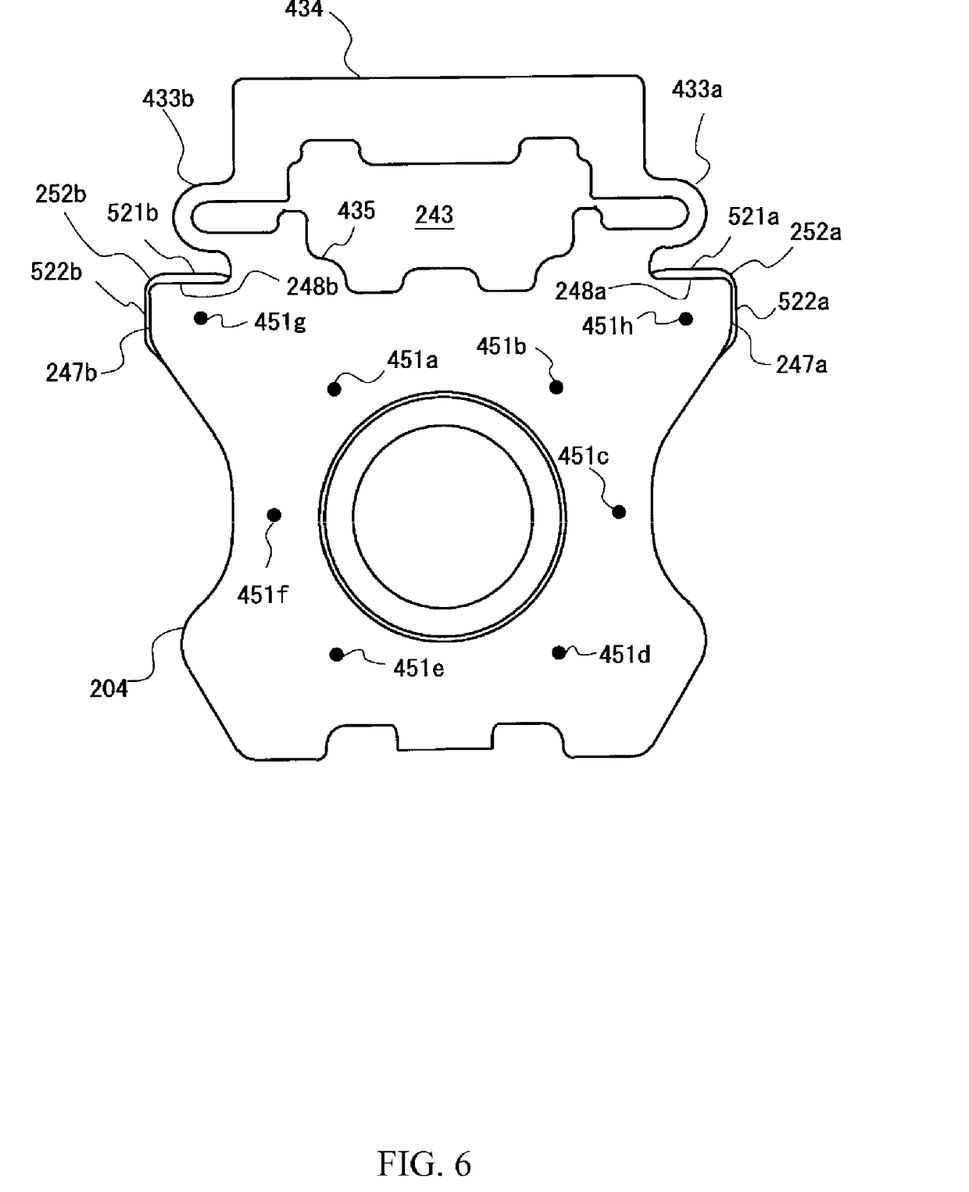
FIG. 6 is another top view schematically showing the structures of the deformable plate and the base plate in HGA, in accordance with one or more embodiments of the present invention.

With reference now to FIG. 6, in accordance with one or more embodiments of the present invention, a top view is shown of the deformable plate 204 and the base plate 205 affixed on top and is seen from the deformable plate side, which is the lower side. In accordance with an embodiment of the present invention shown in FIG. 6, the projection members 252a and 252b project out further outside than the portion overlapping the projection members 252a and 252b of the deformable plate 204. Specifically, the outer edges 522a and 522b in the left-right direction of the projection members 252a and 252b are further to the outside than the outer edges 247a and 247b in the deformable plate 204.

The front edges 521a and 521b of the projection members 252a and 252b are further in front, which is outside, than the front edges 248a and 248b, which is part of the outside edge, of the above-mentioned portion in the deformable plate 204. In this example, the front edges 521a and 521b are between the front edges 248a and 248b and the spring members 433a and 433b.

The outer edges 522a and 522b of the projection members 252a and 252b in the left-right direction are further to the outside than the outer edges 247a and 247b of the deformable plate 204; and, the outer edges 522a and 522b can be used for the handling and positioning of HGA 200 during the manufacture of the HSA.

In FIG. 6, points 451a-451h indicate the laser spot welding points for affixing the deformable plate 204 and the base plate 205. In order to affix the deformable plate 204 and the base plate 205 with good balance by a few welding points, in accordance with an embodiment of the present invention, the welding points are in a circumference enclosing the holes 250 and 251. In the structural example of FIG. 6, in accordance with an embodiment of the present invention, points 451a-451f exist in the circumference enclosing the holes 250 and 251.

Furthermore, in accordance with another embodiment of the present invention, to more effectively strengthen the rigidity by using the projection members 252a and 252b, in addition to the affixing points on the above-mentioned circumference, the affixing points 451g and 451h positioned further in front of the other points are formed as in this structure. The positions in the front-back direction of the affixing points 451g and 451h are in front of the center in the front-back direction between the front edges of the holes 250 and 251 and the back edge of the hole 241, associated with through-hole 243; and, the strengthening of the rigidity by the projection members 252a and 252b is more effective. Furthermore, in accordance with an embodiment of the present invention, the affixing points 451g and 451h are positioned further to the outside than points 451a-451f; affixing point 451g is positioned further to the left than points 451a-451f; and, affixing point 451h is positioned further to the right than points 451a-451f.

With further reference to FIG. 5, in accordance with one or more embodiments of the present invention, the base plate 205 includes the projection members 252a and 252b in the front, and the back edge 256 has an arc shape, which may be a semicircular shape. The shape of this back edge 256 contributes to the reduction in the weight of the base plate 205, as well as the suspension 110. In accordance with an embodiment of the present invention, each of the projection members 252a and 252b has the shape described above. Even in a structure having the shape described above for only one of the projection members 252a and 252b, that projection member can give the effect described above.

As set forth above, embodiments of the present invention have been described by way of examples; but, embodiments of the present invention are not limited to the above-described examples, as embodiments of the present invention can, of course, be modified, added to, and/or elements of the examples converted in various ways within the spirit and scope of embodiments of the present invention. For example, embodiments of the present invention include disk drives with data-storage disks other than magnetic-recording disks used in HDDs, such as: optical disks, and magneto-optical disks, by way of example without limitation thereto. By way of another example, embodiments of the present invention can be applied to a disk drive with a head-slider including only a read element. Moreover, embodiments of the present invention are not limited by the number of piezoelectric elements mounted on the suspension, as described above.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A head-gimbal assembly, comprising:
a slider,
a gimbal comprising a first surface that is affixed to said slider,
a load beam affixed to a surface opposite said first surface of said gimbal,
a deformable plate affixed to a back side of said load beam,
a piezoelectric element affixed to said deformable plate,
a base plate that is affixed to said deformable plate behind said piezoelectric element and is separated from said piezoelectric element;
wherein said deformable plate comprises:
a hole where at least a portion pierces through;
a first section that is in front of said hole and is affixed to said load beam;
a second section that is behind said hole and is affixed to said base plate; and
first and second spring members that join said first section and said second section, can deform in a front-back direction in response to a motion of said piezoelectric element, and are positioned to sandwich said hole in a left-right direction;
wherein said piezoelectric element is affixed between said first section and said second section;

wherein said base plate comprises projection members that are on a front edge of said plate and project out toward said first section while avoiding said piezoelectric element; and wherein front edges of said projection member are positioned further to a front edge than a back edge of said hole.

2. The head-gimbal assembly of claim 1, wherein said base plate comprises said projection members on a left and right of said front edge.

3. The head-gimbal assembly of claim 1, wherein said piezoelectric element is affixed in said hole.

4. The head-gimbal assembly of claim 1, wherein said spring members and said base plate do not overlap when viewed in a layering direction of said load beam and said gimbal.

5. The head-gimbal assembly of claim 1, wherein said front edges of said projection members are positioned further back than said spring members.

6. The head-gimbal assembly of claim 1, wherein outer edges in a left-right direction of said projection members are positioned further to an outside in said left-right direction than outer sides of said spring members.

7. The head-gimbal assembly of claim 1, wherein said front edges of said projection members are positioned further in front than a back edge of said piezoelectric element.

8. The head-gimbal assembly of claim 1, wherein said base plate has a left-right symmetric shape.

9. The head-gimbal assembly of claim 1, wherein at least a portion of outer edges in a left-right direction of said projection members projects further to an outside than a portion that overlaps a portion of said deformable plate.

10. The head-gimbal assembly of claim 1, wherein fixing points of said base plate and said deformable plate are further in front than a center between a back edge of said hole and a front edge of a swage hole.

11. A disk drive, comprising:
at least one disk;
at least one head-slider comprising:
  a slider; and
  a head disposed at a distal end of said head-slider, said head configured to read data from, and to write data to, said disk; and
at least one head-gimbal assembly comprising:
  said slider,
  a gimbal comprising a first surface that is affixed to said slider,
  a load beam affixed to a surface opposite said first surface of said gimbal,
  a deformable plate affixed to a back side of said load beam,
  a piezoelectric element affixed to said deformable plate,
  a base plate that is affixed to said deformable plate behind said piezoelectric element and is separated from said piezoelectric element;
wherein said deformable plate comprises:
  a hole where at least a portion pierces through;
  a first section that is in front of said hole and is affixed to said load beam;
  a second section that is behind said hole and is affixed to said base plate; and
  first and second spring members that join said first section and said second section, can deform in a front-back direction in response to a motion of said piezoelectric element, and are positioned to sandwich said hole in a left-right direction;
wherein said piezoelectric element is affixed between said first section and said second section;
wherein said base plate comprises projection members that are on a front edge of said plate and project out toward said first section while avoiding said piezoelectric element; and
wherein front edges of said projection member are positioned further to a front edge than a back edge of said hole.

12. The disk drive of claim 11, wherein said base plate comprises said projection members on a left and right of said front edge.

13. The disk drive of claim 11, wherein said piezoelectric element is affixed in said hole.

14. The disk drive of claim 11, wherein said spring members and said base plate do not overlap when viewed in a layering direction of said load beam and said gimbal.

15. The disk drive of claim 11, wherein said front edges of said projection members are positioned further back than said spring members.

16. The disk drive of claim 11, wherein outer edges in a left-right direction of said projection members are positioned further to an outside in said left-right direction than outer sides of said spring members.

17. The disk drive of claim 11, wherein said front edges of said projection members are positioned further in front than a back edge of said piezoelectric element.

18. The disk drive of claim 11, wherein said base plate has a left-right symmetric shape.

19. The disk drive of claim 11, wherein at least a portion of outer edges in a left-right direction of said projection members projects further to an outside than a portion that overlaps a portion of said deformable plate.

20. The disk drive of claim 11, wherein fixing points of said base plate and said deformable plate are further in front than a center between a back edge of said hole and a front edge of a swage hole.

* * * * *